(12) United States Patent
Mizukami (10) Patent No.: US 7,492,836 B2
(45) Date of Patent: Feb. 17, 2009

(54) WIRELESS DATA COMMUNICATION DEMODULATION DEVICE AND DEMODULATION METHOD

(75) Inventor: Hiromitsu Mizukami, Suwa (JP)

(73) Assignee: Seiko Epson Corporation (JP)

( * ) Notice: Subject to any disclaimer, the term of this patent is extended or adjusted under 35 U.S.C. 154(b) by 680 days.

(21) Appl. No.: 10/862,190

(22) Filed: Jun. 4, 2004

(65) Prior Publication Data

US 2005/0013389 A1    Jan. 20, 2005

(30) Foreign Application Priority Data

Jun. 5, 2003   (JP) ............... 2003-161165
Feb. 23, 2004  (JP) ............... 2004-046557

(51) Int. Cl.
  *H03D 3/00*   (2006.01)
  *H03K 9/10*   (2006.01)
(52) U.S. Cl. ............... 375/323; 375/329; 375/334; 329/300; 329/304
(58) Field of Classification Search ............... 375/323, 375/327, 329, 334; 329/300, 304, 302
  See application file for complete search history.

(56) References Cited

U.S. PATENT DOCUMENTS

| 4,674,105 | A |   | 6/1987 | Suzuki |            |
|-----------|---|---|--------|--------|------------|
| 5,126,998 | A | * | 6/1992 | Stem, Jr. | 370/204 |
| 5,809,084 | A | * | 9/1998 | Shida et al. | 375/318 |
| 6,038,269 | A | * | 3/2000 | Raghavan | 375/340 |
| 6,947,508 | B2| * | 9/2005 | Freidhof et al. | 375/350 |

FOREIGN PATENT DOCUMENTS

| JP | 2712706 B | 10/1997 |
|----|-----------|---------|
| JP | 2877198 B | 1/1999  |
| JP | 3130773 B | 11/2000 |

OTHER PUBLICATIONS

European Patent Office—European Search Report regarding counterpart application, Mar. 11, 2005.
Marvin K. Simon, et al., "Detection of Digital FSK and PSK Using a First-Order Phase-Locked Loop", IEEE Transactions on Communications, vol. Com-25, No. 2, pp. 200-214 (Feb. 1977).
Bang-Sup Song, "Synchronous Data Recovery in RF Communication Channels", IEEE Journal of Solid-State Circuits, vol. SC-22, No. 6, pp. 1169-1176 (Dec. 1987).
Wenjun Sheng, et al., "A 3-V, 0.35-μm CMOS Bluetooth Receiver IC", IEEE Journal of Solid-State Circuits, vol. 38, No. 1, pp. 30-42 (Jan. 2003).

* cited by examiner

*Primary Examiner*—Jean B Corrielus
(74) *Attorney, Agent, or Firm*—Harness, Dickey & Pierce, P.L.C.

(57) ABSTRACT

When a first half of a transmission packet is sent by an FSK modulating signal, and a latter half thereof is sent by a PSK modulating signal, a received signal is converted into an intermediate frequency signal by a mixer. The converted intermediate frequency signal is switched to an FSK demodulation unit and a PSK demodulation unit by a received signal changeover switch. A frequency error detection circuit is provided in the FSK demodulation unit to detect a frequency error detection value. A demodulation circuit of a phase locked loop type of the PSK demodulation unit includes a loop filter. The frequency error detection value detected by the frequency error detection circuit is set as an initial value of this loop filter, whereby a time until lockup of a phase locked loop is reduced at the time when reception of a PSK modulating signal is started.

8 Claims, 7 Drawing Sheets

WIRELESS DATA COMMUNICATION DEMODULATION DEVICE AND DEMODULATION METHOD

RELATED APPLICATIONS

This application claims priority to Japanese Patent Application No. 2003-161165 filed Jun. 5, 2003 and 2004-046557 filed Feb. 23, 2004 which are hereby expressly incorporated by reference herein in their entirety.

BACKGROUND

1. Technical Field

The present invention relates to a wireless data communication demodulation method of receiving and demodulating a transmission packet, a former half of which is sent by a frequency shift keying modulating signal and a latter half of which is sent by a phase-shift keying modulating signal.

2. Background Art

In general, in a short distance wireless data communication system using an ISM band of 2.4 GHz, a transmission packet is sent by a frequency shift keying modulating signal, and frequency shift keying demodulation is performed on a reception side as well.

Figure 2:
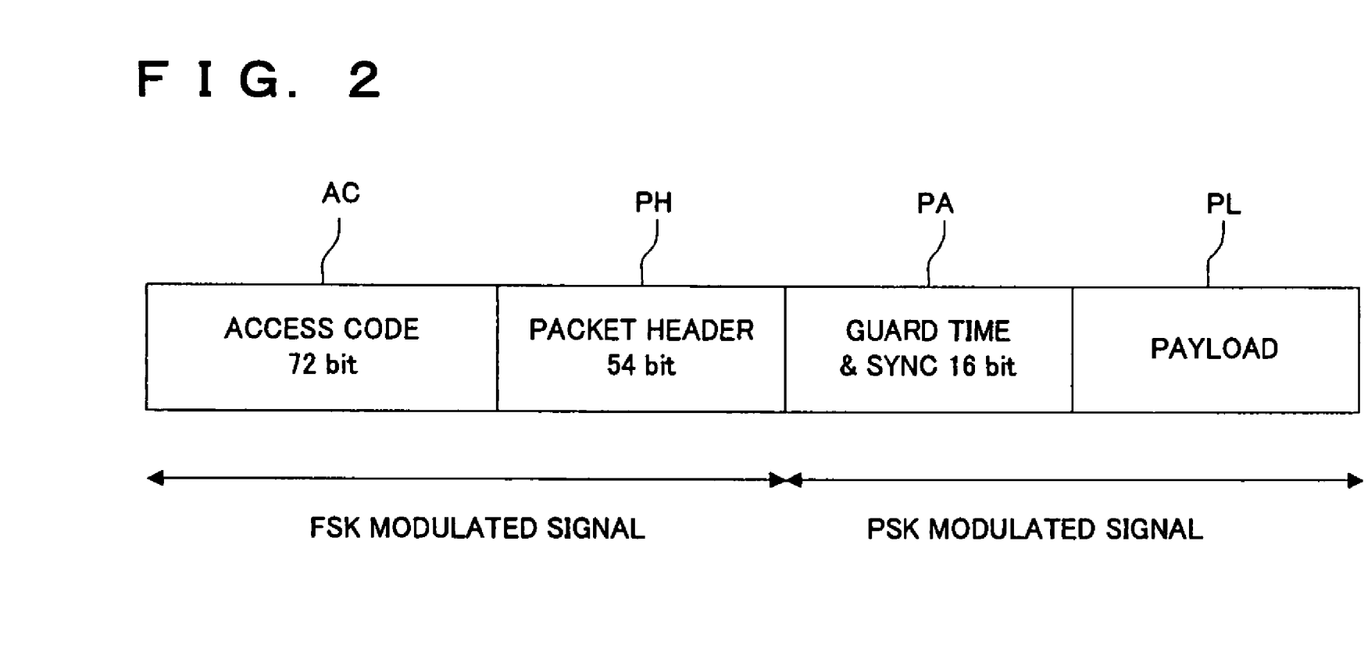
FIG. 2 is a diagram showing a format of a transmission packet.

In such short distance wireless data communication, a transmission packet, which is constituted by a scramble code, a header, and a payload, is sent. However, due to a demand for speeding-up data communication, there has been proposed that a transmission packet, in which a guard time and a preamble portion of 16 bits for performing synchronization are arranged between a header PH and a payload PL as shown in FIG. 2, should be formed, an access code AC and the header PH should be sent by a frequency shift keying modulating signal, and the preamble portion PA and the payload PL should be sent by a phase-shift keying modulating signal.

In the case in which a former half of the transmission packet is sent by the frequency shift keying modulating signal and a latter half thereof is sent by the phase-shift keying modulating signal in this way, it is known that, since phase-shift keying modulation is adopted, carrier frequency shift (frequency offset) changes to phase demodulation distortion to significantly affect a bit error rate (BER).

As a compensation method for this frequency offset, there has been proposed a demodulation device for wireless data communication which is adapted to, when a lockup time for PLL is insufficient only during preamble reception, continuously perform differential detection in a data area of a frame to demodulate data and simultaneously perform an operation of the PLL to thereby compare data qualities of the differential detection and synchronous detection when the PLL lockup time has passed and select a suitable demodulation operation on a space transmission environment thereof (e.g., see Japanese Patent No. 3130773 (pages 1 to 4, FIG. 1)).

In addition, there has also been proposed an applied phase detection synchronization method such that an input signal is stored in a buffer memory once, and after applying trial mode processing, which estimates an angular frequency detuning degree and an initial phase difference and applicatively corrects a free-running angular frequency and an initial phase, to the stored input signal, performing normal mode processing which is conventional PLL processing to thereby realize an expansion of a synchronizing pull-in range of a PLL and a reduction in a noise band simultaneously (e.g., see Japanese Patent No. 2712706 (pages 1 to 10, FIG. 2)).

Similarly, there has been proposed a digital PLL circuit having a loop portion including phase comparing means, phase adjusting means, a loop filter, and a numerical control oscillator, which is adopted to find an average frequency error and phase error information from data for continuous n+1 symbols of phase data, which is continuously input to the phase comparing means, and start loop means when an average phase error is preset in the loop filter of the PLL circuit and phase information is preset in the numerical control oscillator to thereby calculate a time for loop pull-in (lock-in time) (e.g., see Japanese Patent No. 2877198 (pages 1 to 6, FIG. 2)).

However, when the above-mentioned transmission packet shown in FIG. 2 is received, since the preamble portion is as small as 16 bits, it is necessary to establish phase lock for phase-shift keying demodulation within a period of this preamble portion in switching the frequency shift keying modulating signal of the former half to the phase-shift keying modulating signal of the latter half.

In the conventional example described in Japanese Patent No. 3130773 (pages 1 to 4, FIG. 1), assuming a case in which frequency synchronization is not established by a preamble, the differential detection is performed during a period until the frequency synchronization is established, and the differential detection is switched to the synchronization detection after it is judged that a frequency is locked. However, since the differential detection is generally inferior to the synchronization detection in a bit error rate (BER) characteristic, in the case in which the differential detection is performed until the synchronization is established, it is likely that an error occurs in that period. Thus, in the short distance wireless data communication using the phase-shift keying modulation, since an error of 1 bit directly leads to a packet loss, there is an unsolved problem in that the packet loss increases.

In addition, in the conventional example described in Japanese Patent No. 2712706 (pages 1 to 10, FIG. 2), it is necessary to store an input signal in a buffer memory once because an initial value of a PLL is decided according to plural times of trial modes, and it is necessary to increase the number of times of trial modes in order to obtain a more accurate initial value. Thus, there is an unsolved problem in that required buffer memories increase in accordance with the increase in the number of times of trial modes, and a size of an overall structure increases.

Moreover, in the conventional example described in Japanese Patent No. 2877198 (pages 1 to 6, FIG. 2), delay means for finding a frequency initial value is required, and it is desirable to average a large number of bits in order to obtain a more accurate initial value. Thus, there is an unsolved problem in that a scale of a circuit increases.

Thus, the present invention has been devised directing attention to the unsolved problems of the conventional examples, and it is an object of the present invention to provide a wireless data communication demodulation device and a demodulation method which can accurately establish phase lock in a short preamble period.

SUMMARY

A first technical means is a wireless data communication demodulation device which receives and demodulates a transmission packet, a front half of which is sent by a frequency shift keying modulating signal and a latter half of which is sent by a phase-shift keying modulating signal, the wireless data communication demodulation device characterized by including: an FSK demodulation unit which demodulates the frequency shift keying modulating signal; and a PSK demodulation unit which demodulates the phase-shift keying modulating signal, and in that the FSK demodulation unit includes frequency error detecting means which detects a frequency error of the frequency shift keying modulating signal, the PSK demodulation unit includes a demodulation circuit of a phase locked loop type including a loop filter, and a frequency error detection value detected by the frequency error detecting means is set as an initial value of the loop filter.

In this first technical means, for example, an access code AC and a packet header PH, which are sent by the frequency shift keying modulating signal, are sufficiently long compared with a preamble portion PA of 16 bits, which is applied to the preparation for phase-shift keying demodulation. A center frequency can be found from this frequency shift keying modulating signal to accurately estimate a frequency error between a transmitter and a receiver, and this estimated frequency error is set as an initial value of a loop filter included in the demodulation circuit of the phase locked loop type of the PSK demodulation unit, whereby a time until lockup can be reduced significantly.

A second technical means is characterized in that, in the first technical means, the frequency error detecting means includes: average value calculating means which calculates an average frequency of a frequency shift keying demodulating signal obtained by demodulating the frequency shift keying modulating signal with a receiving circuit; and subtracting means which calculates a deviation between the average frequency calculated by the average value calculating means and a reference frequency of the frequency shift keying demodulating signal.

In this second technical means, an average frequency of a frequency shift keying demodulating signal, which is demodulated by the receiving circuit, is calculated by the average value calculating means, a deviation between an average frequency calculated by the subtracting means and a reference frequency of the frequency shift keying demodulating signal is calculated to detect a frequency error. Thus, the frequency error can be detected accurately.

A third technical means is characterized in that, in the first or the second technical means, the PSK demodulation unit includes: orthogonal detection means which orthogonally detects a phase-shift keying modulating signal; A/D converting means which subjects an in-phase component and a quadrature component detected by the orthogonal detection means to A/D conversion using a clock synchronizing with a symbol obtained by the FSK demodulation unit; and the demodulation circuit of the phase locked loop type to which the in-phase component and the quadrature component, which are outputted from the A/D converting means, are inputted.

In this third technical means, an in-phase component and a quadrature component is subjected to A/D conversion by the A/D converting means, which constitutes the PSK demodulation unit, using a clock synchronizing with a symbol obtained by the FSK demodulation unit. Thus, frequency pull-in becomes possible immediately at the time when reception of a phase-shift keying modulating signal is started, a time until lockup can be reduced, and a bit error rate characteristic at the time of phase-shift keying demodulation can be improved.

A fourth technical means is characterized in that, in any one of the first to the third technical means, the demodulation circuits includes: a complex multiplier which gives phase rotation of a predetermined angle to an in-phase component and a quadrature component, which are outputted from the A/D converting means, on the basis of a sine wave and a cosine wave for causing the components to coincide with a phase of an ideal signal point; a low pass filter to which the in-phase component and the quadrature component subjected to the phase rotation which are outputted from the complex multiplier are inputted; a data reproduction circuit to which an output of the low pass filter is inputted; a frequency offset detection circuit to which the in-phase component and the quadrature component, which are outputted from the low pass filter, are inputted; a loop filter to which a frequency offset detection value of the frequency offset detection circuit is inputted and a frequency error detection value, which is detected as an initial value by the frequency error detecting means, is inputted as an initial value; and a numerical control oscillator to which an output of the loop filter is inputted and which forms the sine wave and the cosine wave which are supplied to the complex multiplier.

In this fourth technical means, phase rotation of a predetermined angle is given to an in-phase component and a quadrature component, which are outputted from the A/D converting means, so as to cause the in-phase component and the quadrature component to coincide with a phase of an ideal signal point using a sine wave and a cosine wave formed by the phase lock detecting means using the complex multiplier, and an output of the complex multiplier is supplied to the data reproduction circuit after intersymbol interference is removed from the output by the low pass filter, whereby demodulated data is reproduced. At this point, an output of the low pass filter is supplied to the frequency offset detecting means to find a frequency offset detection value, this frequency offset detection value is supplied to the loop filter to form a sine wave and a cosine wave, and the sine wave and the cosine wave are supplied to the complex multiplier. In this case, at the time when reception of a phase-shift keying modulating signal is started, a frequency error detection value, which is detected by the frequency error detecting means formed in the FSK demodulation unit, is set in the loop filter as an initial value, whereby a time until lockup can be reduced at the time when reception of the phase-shift keying modulating signal is started.

A fifth technical means is characterized in that, in any one of the first to the third technical means, the demodulation circuit includes: an angle calculator which calculates phase information from an in-phase component and a quadrature component which are outputted from the A/D converting means; phase comparing means which compares the phase information, which is outputted from the angle calculator, and a phase signal; a judgment circuit which reproduces demodulated data on the basis of the phase signal which is outputted from the phase comparing means; phase offset detecting means to which the phase signal of the phase comparing means is inputted; and a loop filter to which an offset detection value of the phase offset detecting means is inputted and a frequency error detection value detected by the frequency error detecting means is inputted as an initial value and which outputs a phase signal to the phase comparing means.

In this fifth technical means, an in-phase component and a quadrature component, which are outputted from the A/D converting means, are supplied to the angle calculator to calculate phase information, the calculated phase information is compared with phase information, which is detected by the loop filter, by the phase comparing means to obtain phase information, phase-shift of which is corrected, and the phase information is supplied to the judgment circuit to output demodulated data. Here, in the phase lock detecting means, the phase information outputted from the phase comparing means is supplied to the phase offset detection circuit to detect phase offset, and a detected phase offset value is supplied to the loop filter to output a phase signal. When a reception state of a frequency shift keying modulating signal is switched to a reception state of a phase-shift keying modulating signal, a frequency error detection value, which is detected by the frequency error detecting means formed in the FSK demodulation unit, is set as an initial value of the loop filter, whereby a time until lockup can be reduced at the time when receipt of a phase-shift keying modulating signal is started.

A sixth technical means is characterized in that, in the fourth or the fifth technical means, the loop filter includes: a first multiplier and a second multiplier which multiply an inputted offset value by a first filter coefficient and a second filter coefficient; a first adder which adds an output of an integration gain regulator and an output of a latch circuit; a second adder which adds an added output of the first adder and an output of the first multiplier to form an output to the numerical control oscillator; and a multiplexer to which the added output of the first adder and a frequency error detection value detected by the frequency error detecting means are inputted as initial values and which selects these values and outputs the values to the latch circuit.

This sixth technical means supplies a value found by multiplying an inputted frequency or phase offset value by a first filter coefficient to the first adder, supplies a value found by multiplying the offset value by a second filter coefficient to the second adder, and supplies an output of this second adder to the first adder and to the multiplexer, and a frequency error detection value is selected by this multiplexer at the time when reception of a phase-shift keying modulating signal is started, whereby this frequency error detection value is latched by the latch circuit which is supplied to the second adder. Consequently, an output of the first adder represents a substantially lock state at an initial time of reception of the phase-shift keying modulating signal, and a time until lockup can be reduced at the time when reception of the phase-shift keying modulating signal is started.

A seventh technical means is a wireless data communication demodulation method of receiving and demodulating a transmission packet, a former half of which is sent by a frequency shift keying modulating signal and a latter half of which is sent by a phase-shift keying modulating signal, the wireless data communication demodulation method characterized by demodulating the frequency shift keying modulating signal while detecting a frequency error in an FSK demodulation unit and, thereafter, in starting demodulating the phase-shift keying modulating signal in a PSK demodulation unit, setting a frequency error detection value detected by the FSK demodulation unit as an initial value of a loop filter included in a demodulation circuit of a phase locked loop type constituting the PSK modulation unit.

In this seventh technical means, as in the first technical means, for example, an access code and a packet header, which are sent by the frequency shift keying modulating signal, are sufficiently long compared with a preamble portion of 16 bits, which is applied to preparation for phase-shift keying demodulation. A center frequency can be found from this frequency shift keying modulating signal to accurately estimate a frequency error between a transmitter and a receiver, and this estimated frequency error is set as an initial value of a loop filter included in the demodulation circuit of the phase locked loop type of the PSK demodulation unit, whereby a time until lockup can be reduced significantly.

DETAILED DESCRIPTION

Embodiments of the present invention will be hereinafter described on the basis of the drawings.

Figure 1:
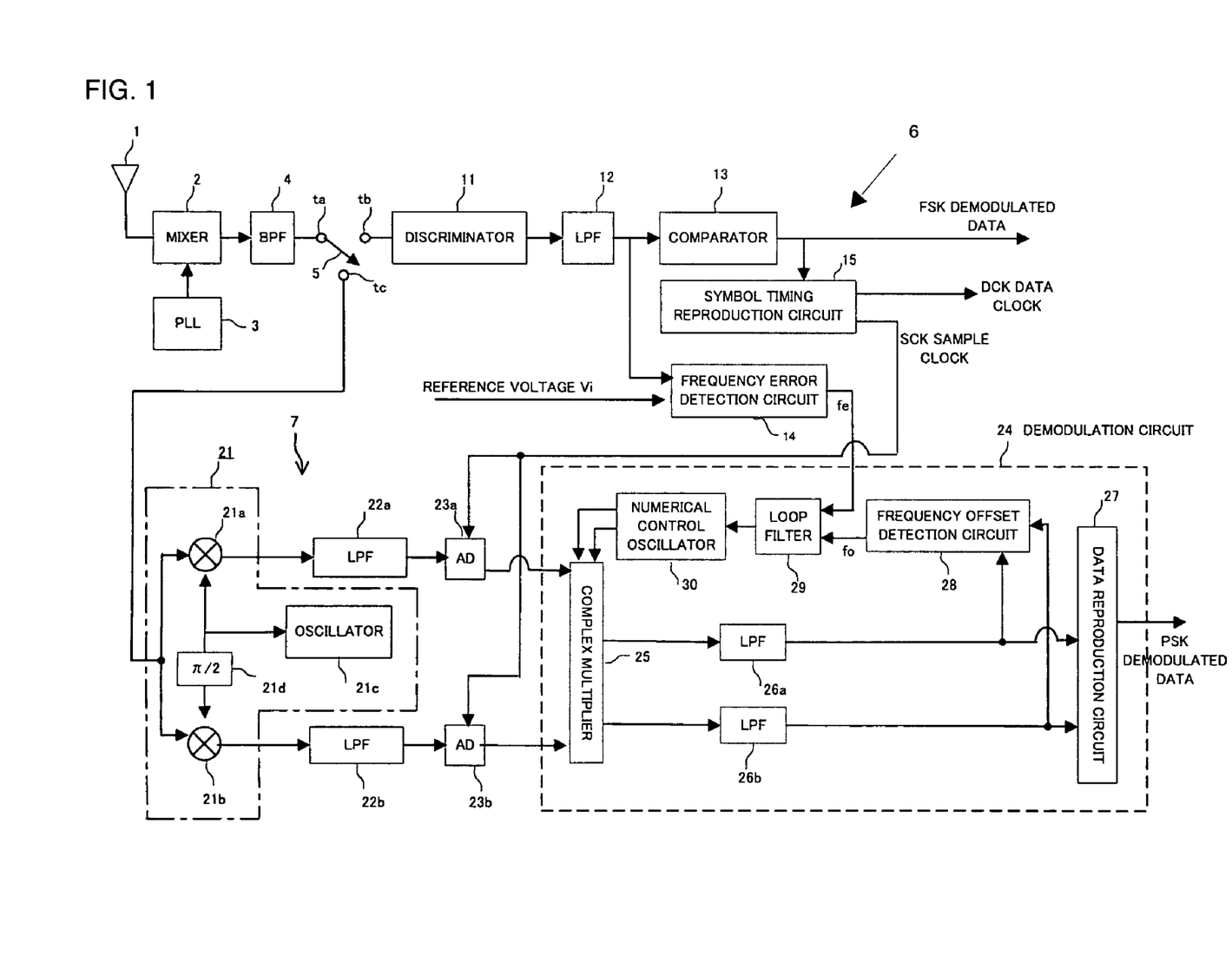
FIG. 1 is a block diagram showing a first embodiment of the present invention.

FIG. 1 is a block diagram showing a first embodiment of the present invention and showing a wireless data communication demodulation device in the case in which the wireless data communication demodulation device is applied to a short distance wireless communication system which uses an ISM band of 2.4 GHz.

In the figure, reference sign WD denotes a wireless data communication demodulation device. This wireless data communication demodulation device WD includes a receiving antenna 1 and receives a transmission packet shown in FIG. 2, which is sent from a transmission side, with this receiving antenna 1. The received signal is supplied to a mixer 2 and is multiplied by a local oscillation signal, which is inputted from a phase locked loop (hereinafter referred to as PLL) circuit 3 and subjected to down-convert to be converted into an intermediate frequency signal (IF signal) by this mixer 2.

Here, as shown in FIG. 2, a format of the transmission packet to be sent on the transmission side includes, for example, an access code AC of 72 bits which is a code for specifying a small size network, a packet header PH of 54 bits which performs communication management in the small size network, a preamble PA of 16 bits which performs guard time and synchronization, and a payload PL which stores data. The access code AC and the packet header PH are sent by a frequency shift keying (hereinafter referred to as FSK) modulating signal, and the preamble PA and the payload PL are sent by a phase-shift keying (hereinafter referred to as PSK) modulating signal.

Further, the intermediate frequency signal, which is outputted from the mixer 2, is supplied to a movable input terminal ta of a received signal changeover switch 5 through a band pass filter 4. One fixed output terminal tb of this received signal changeover switch 5 is connected to an FSK demodulation unit 6 which subjects the received signal to frequency shift keying demodulation, and the other fixed output terminal tc is connected to a PSK demodulation unit 7 which subjects the received signal to phase-shift keying demodulation. Here, in the received signal changeover switch 5, the movable input terminal ta is switched to the fixed output terminal tb side during a period from a time when reception of the transmission packet shown in FIG. 2, which has been sent from the transmission side, is started until a time when the packet header PH ends. When the packet header PH ends, the movable input terminal ta is switched to the fixed output terminal tc side.

The FSK demodulation unit 6 includes: a discriminator 11 which converts an intermediate frequency signal connected to the fixed output terminal tb of the received signal changeover switch 5 into a voltage signal; a low pass filter 12 which removes a high-frequency noise signal component from the voltage signal which is outputted from this discriminator 11; a comparator 13 in which an output of this low pass filter 12 is inputted and which compares the output with a reference voltage and converts the output into a binary signal to output FSK demodulated data; a frequency error detection circuit 14 as frequency error detecting means to which the output of the low pass filter 12 is inputted and a reference signal without offset is inputted; and a symbol timing reproduction circuit 15 to which demodulated data outputted from the comparator 13 is inputted.

Figure 3:
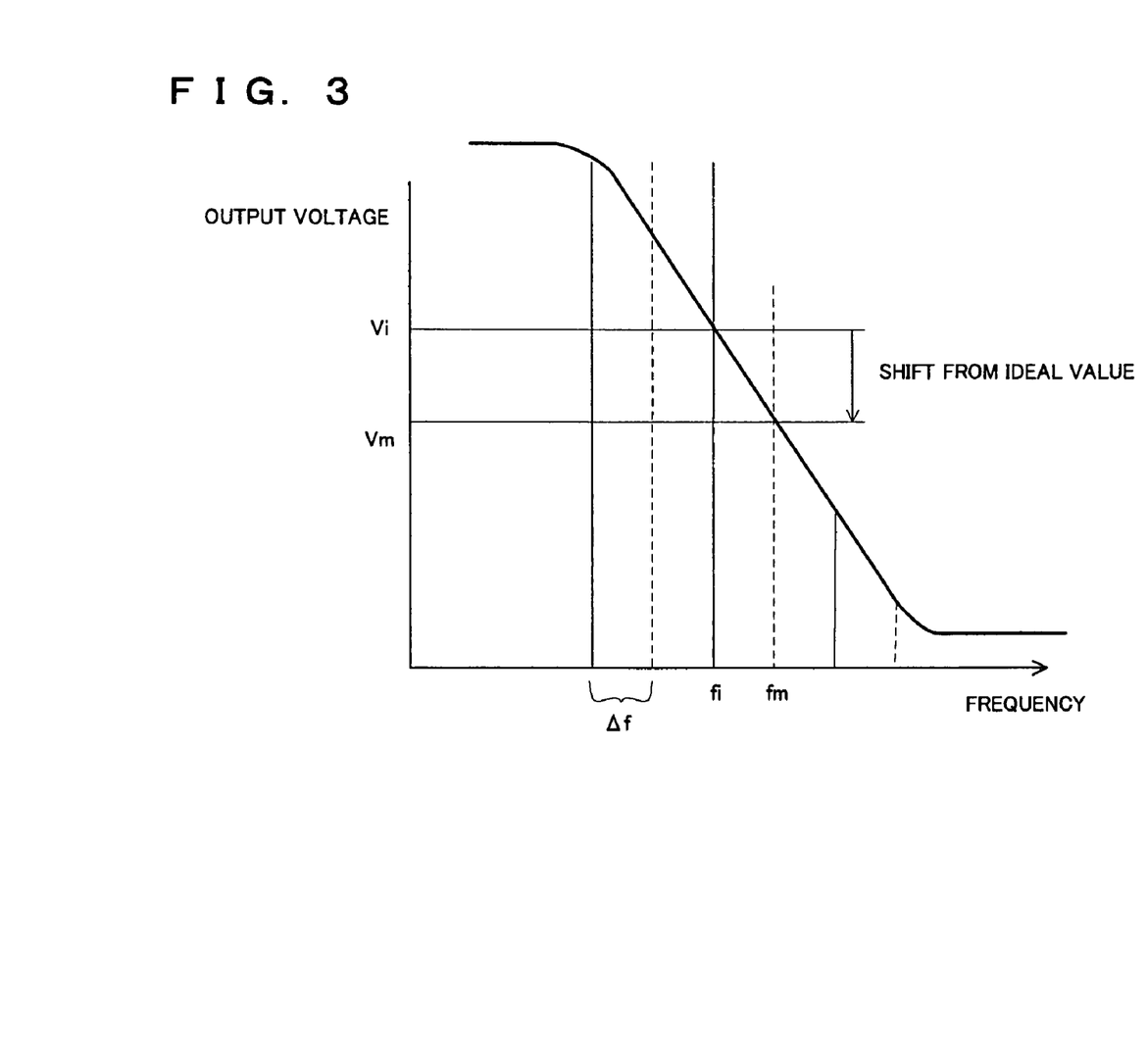
FIG. 3 is a characteristic line showing a discriminator characteristic.

Here, as shown in FIG. 3, when a frequency is plotted on the horizontal axis and an output voltage is plotted on the vertical axis, the discriminator 11 converts a frequency signal into a voltage signal using a characteristic curve having linearity in a desired frequency range.

Figure 4:
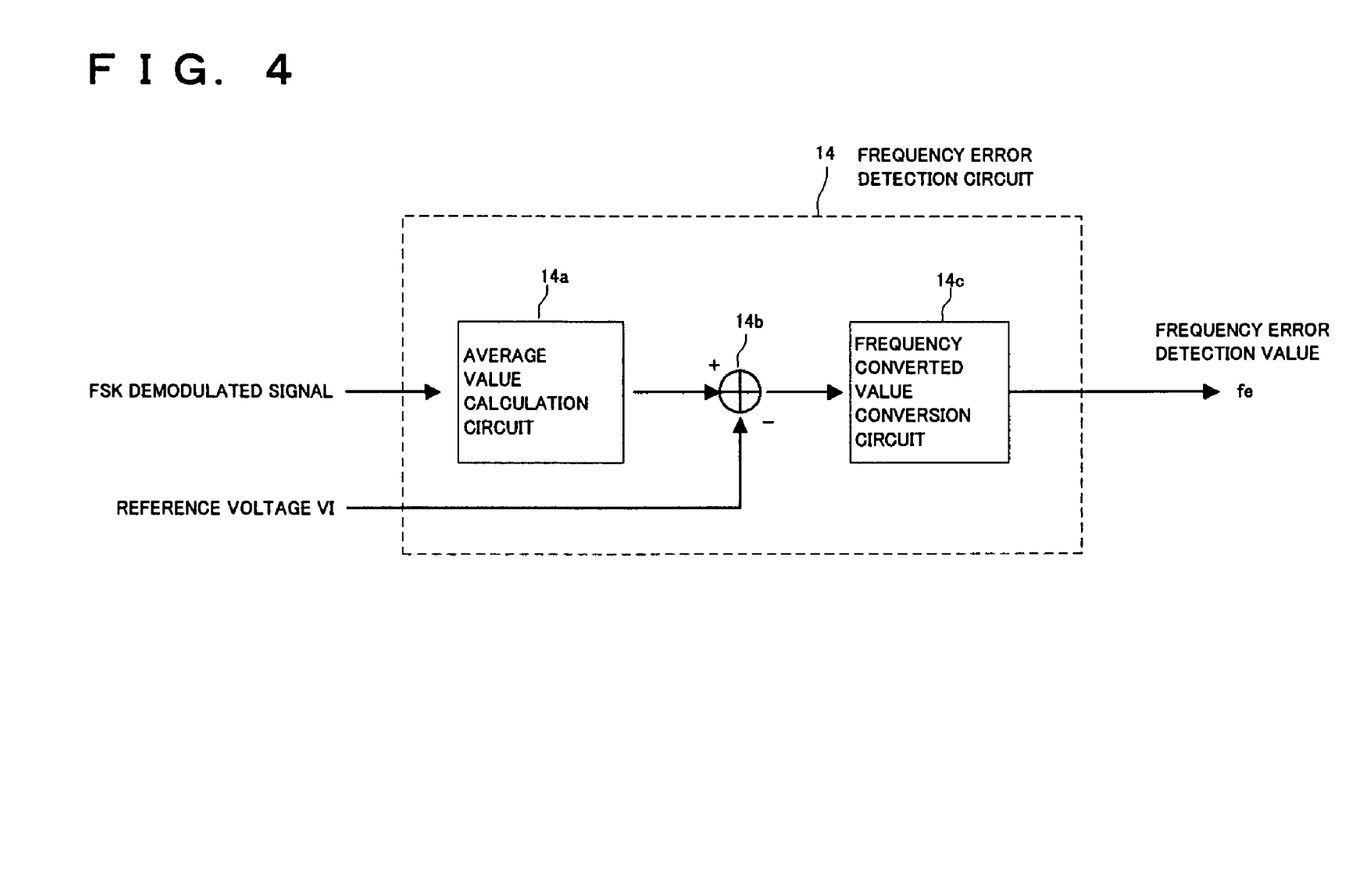
FIG. 4 is a block diagram showing a frequency error detection circuit.

In addition, as shown in FIG. 4, the frequency error detection circuit 14 includes: an average value calculation circuit 14a to which an FSK demodulating signal of the low pass filter 12 is inputted; a subtracter 14b which subtracts a reference signal without offset from an average value, which is outputted from this average value calculation circuit 14a, and calculates a deviation between the average value and the reference signal; and a frequency converted value conversion circuit 14c which converts a subtracted value, which is outputted from this subtracter 14b, into a frequency error detection value. A frequency error detection value fe, which is outputted from the frequency converted value conversion circuit 14c, is supplied to a loop filter of the PSK demodulation unit 7 to be described later.

Figure 5:
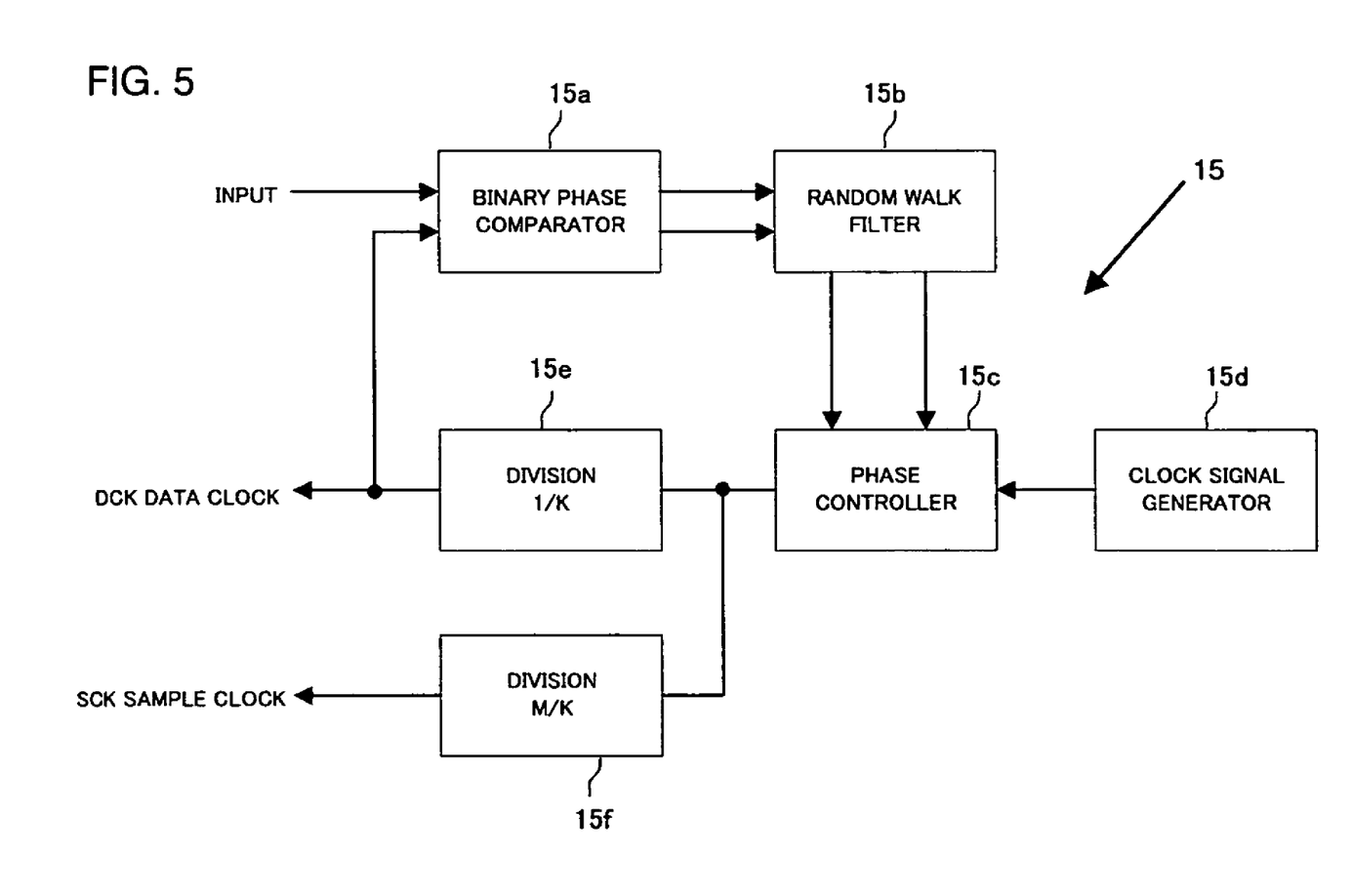
FIG. 5 is a block diagram showing a symbol timing reproduction circuit.

Moreover, as shown in FIG. 5, the symbol timing reproduction circuit 15 compares demodulated data, which is outputted from the comparator 13, and a reproduced data clock, which is outputted from a divider 15e to be described later, detects lead/delay of a phase of the demodulated data, and supplies a lead signal and a delay signal thereof to a random walk filter 15b. This random walk filter 15b is a filter consisting of an integrator, which uses an up-down counter, and includes the up-down counter and a comparator. The up-down counter is reset to a median value in an initial state. The up-down counter counts up according to a lead signal, which is inputted from a phase comparator 15a, and counts down according to a delay signal. The random walk filter 15b compares a count value of the up-down counter and a predetermined up-count threshold value and a predetermined down-count threshold value with the comparator. If the count value exceeds the predetermined threshold values to overflow or underflow, the random walk filter 15b outputs an overflow signal or an underflow signal to a phase controller 15c and resets the up-down counter to the median value. This phase controller 15c outputs a clock signal obtained by adding or removing one pulse to or from the clock signal, which is inputted from a clock signal generator 15d, according to the overflow signal or the underflow signal inputted from the random walk filter. This clock signal is supplied to the divider 15e to be divided to 1/K, and a data clock DCK is formed. This is supplied to a binary phase comparator 15a, whereby the data clock DCK is controlled so as to synchronize with a phase of modulated data to be inputted. In addition, the data clock DCK, which is outputted from the divider 15e, is supplied to a not-shown data processing unit together with the demodulated data. Further, the clock signal outputted from the phase controller 15c is supplied to a divider 15f to be divided to M/k, and a sample clock SCK is formed. This sample clock SCK is supplied to an A/D converter of a PSK modulation unit to be described later.

In addition, the PSK demodulation unit 7 includes: an orthogonal detection circuit 21 which converts an intermediate frequency signal, which is inputted from the fixed output terminal tc of the received signal changeover switch 5, into an in-phase component (I component) and a quadrature component (Q component); low pass filters 22a and 22b to which the in-phase component and the quadrature component, which are outputted from this orthogonal detection circuit 21, are inputted and which remove a frequency component of ½ or more of a sampling frequency of A/D converters 23a and 23b of the next stage from the in-phase component and the quadrature component; A/D converters 23a and 23b to which filter outputs of the low pass filters 22a and 22b are inputted and a sample clock SCK, which is outputted from the symbol timing reproduction circuit 15 of the FSK demodulator 6, is inputted and which converts the filter outputs into digital signals; and a demodulation circuit 24 of a phase locked loop (PLL) type to which output signals of the A/D converters 23a and 23b are inputted.

The orthogonal detection circuit 21 includes: two mixers 21a and 21b to which an intermediate frequency signal, which is inputted from the fixed output terminal tc of the received signal changeover switch 5, is branched and inputted; and an oscillator 21c which outputs a local oscillation signal, which is supplied to these mixers 21a and 21b. The local oscillation signal outputted from the oscillator 21c is directly supplied to the mixer 21a and is supplied to the mixer 21b via a phase shifter 21d which shifts a phase of the local oscillation signal by 90 degrees, whereby an in-phase component (I component) is outputted from the mixer 21a, and a quadrature component (Q component) is outputted from the mixer 21b. These in-phase component and quadrature component represent a complex base band signal.

In addition, the demodulation circuit 24 includes in a phase locked loop (PLL) manner: a complex multiplier 25 which rotates a digital signal, which is outputted from the A/D converters 23a and 23b, by a predetermined phase and outputs the digital signals by subjecting products, which have orthogonal phases, to addition or subtraction to perform complex multiplication using a sine wave signal and a cosine wave signal which are inputted from a numerical control oscillator 30 to be described later; low pass filters 26a and 26b which removes intersymbol interference from an output signal of this complex multiplier 25 by applying filter processing for a root roll-off characteristic; a data reproduction circuit 27 to which output signals of these low pass filters 26a and 26b are inputted and which reproduces PSK demodulated data; a frequency offset detection circuit 28 to which the outputs signals of the low pass filters 26a and 26b are inputted and which finds an angle on polar coordinates of these input signals and finds a difference between an angle of a received vector of an nth symbol and a received vector of an (n+1)th symbol one after another to thereby detect an offset value fo of a carrier frequency of a received signal and an oscillation frequency of the oscillator 21c of the orthogonal detection circuit 21; a loop filter 29 in which the frequency offset value fo detected by this frequency offset detection circuit 28 and the frequency error detection value fe detected by the frequency error detection circuit 14 in the FSK demodulation unit 6 are inputted; and a numerical control oscillator 30 to which an output of this loop filter 29 is inputted.

Figure 6:
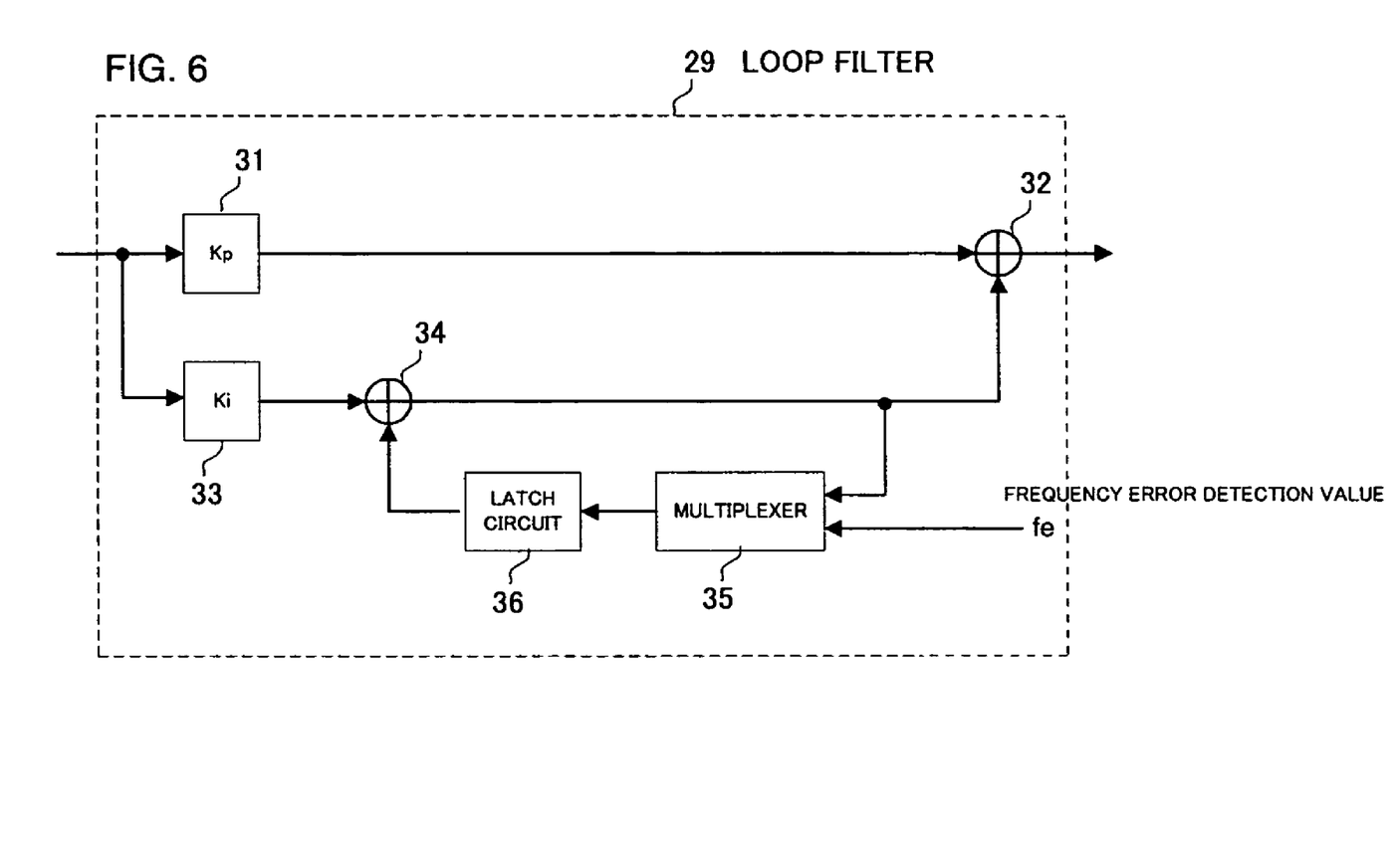
FIG. 6 is a block diagram showing a loop filter.

Here, as shown in FIG. 6, the loop filter 29 has a structure of a loop integrator including: a first multiplier 31 which multiplies the frequency offset value fo, which is outputted from the frequency offset detection circuit 28, by a first filter coefficient Kp; a first adder 32 to which a multiplication output of this multiplier 31 and an addition output of a second adder 34 to be described later are inputted; a second multiplier 33 which multiplies the frequency offset value fo by a second filter coefficient Ki; a second adder 34 which adds a multiplication output of this multiplier 33 and a latch output of a latch circuit 36 to be described later; a multiplexer 35 to which an addition output of this adder 34 and the frequency error detection value fe detected by the frequency error detection circuit 14 of the FSK demodulation unit 6 are inputted as initial values and which selects the frequency error detection value fe at a point when the reception of packet header PH of the transmission packet ends and, thereafter, selects a multiplication output of the second multiplier 33; and a latch circuit 36 which latches a selection output of this multiplexer 35 and outputs the selection output to the second adder 34. A filter output, which is outputted from the first adder 32, is outputted to the numerical control oscillator 30.

The numerical control oscillator 30 generates a sine wave and a cosine wave of a carrier, an output frequency of which changes depending upon a value of a filter output of the loop filter 29, and supplies the generated sine wave and cosine wave to the complex multiplier 25.

Next, an operation of the first embodiment will be described.

Now, the transmission packet shown in FIG. 2 is sent from a not-shown transmitter. First, the access code AC and the packet header PH are sent by an FSK modulating signal and, subsequently, the preamble PA and the payload PL are sent by a PSK modulating signal. Then, when this transmission packet is received by the wireless data communication demodulation device WD, a received signal received by the receiving antenna 1 is supplied to the mixer 2, converted into an intermediate frequency signal (IF signal), and supplied to the received signal changeover switch 5 via the band pass filter 4.

At this point, since a former (front) half of the transmission packet is received, the movable input terminal ta of the received signal changeover switch 5 is switched to the fixed output terminal tb side, and the access code AC and the packet header PH following the access code AC are supplied to the FSK demodulation unit 6.

In this FSK demodulation unit 6, a received signal subjected to FSK modulation is supplied to the discriminator 11, whereby the received signal is converted into a voltage signal by this discriminator 11. This voltage signal is supplied to the comparator 13 via the low pass filter 12, whereby FSK modulated data of a binary signal is reproduced to be outputted to a not-shown signal processing circuit of a later stage.

At this point, a filter output of the low pass filter 12 is supplied to the frequency error detection circuit 14, whereby an average voltage Vm, which corresponds to an average value fm of an actually received FSK demodulating signal in a frequency range indicated by a broken line in FIG. 3, is calculated in the average value calculation circuit 14a of this frequency error detection circuit 14. This average voltage Vm is supplied to the subtractor 14b. An ideal reference voltage Vi without frequency shift at the time of wireless transmission, which corresponds to a center frequency fi in a frequency range indicated by a solid line in FIG. 3, is inputted to this subtractor 14b as a reference signal. The reference voltage Vi is subtracted from the average voltage Vm to calculate a voltage deviation corresponding to frequency shift, and this voltage deviation is supplied to the frequency converted value conversion circuit 14c. The frequency error detection value fe is calculated in association with an amount of frequency shift and is supplied to the loop filter 29 included in the demodulation circuit 24 of the phase locked loop type in the PSK demodulation unit 7.

However, since the FSK modulated signal is being received and demodulated at the present point, and the PSK demodulation unit 7 is in a non-operation state, an operation of the loop filter 29 is also stopped.

In addition, FSK demodulated data, which is demodulated by the comparator 13, is supplied to the symbol timing reproduction circuit 15. A clock signal generated by the clock generator 15d is compared with the data clock DCK, which is controlled by the phase controller 15c and divided and formed by the divider 15e, by the binary phase comparator 15a of this symbol timing reproduction circuit 15 to detect phase lead or phase delay between the clock signal and the data clock DCK. The phase lead or the phase delay is supplied to the up-down counter of the random walk filer 15b, whereby, when the inputted FSK demodulated data is advanced with respect to the data clock DCK, the up-down counter is counted up, and in the opposite case, the up-down counter is counted down. When a count value of the up-down counter has exceeded an up-count threshold value and a down-count threshold value, an overflow signal or an underflow signal is outputted to the phase controller 15c, and the up-down counter is reset to a median value. Consequently, a clock signal, which is obtained by adding or removing one pulse to or from the clock signal to be supplied from the clock generator 15d, is formed by the phase controller 15c. This clock signal is supplied to the dividers 15e and 15f, whereby a data clock DCK and a sample clock SCK, which synchronize with the FSK demodulated data, are formed. The data clock DCK is outputted to the not-shown signal processing circuit, and the sample clock SCK is supplied to the A/D converters 23a and 23b of the PSK demodulation unit 7.

When the demodulation processing in this FSK demodulation unit 6 is continued, and demodulation of the FSK demodulated data corresponding to a final bit of the packet header PH of the transmission packet ends, the movable input terminal ta of the received signal changeover switch 5 is switched from the fixed output terminal tb side to the fixed output terminal tc side, and an intermediate frequency signal, which is obtained by converting a received signal corresponding to the preamble PA of the transmission packet with the mixer 2, is supplied to the PSK demodulation unit 7.

In this PSK demodulation unit 7, the intermediate frequency signal is detected by the orthogonal detection circuit 21, whereby an in-phase component (I component) and a quadrature component (Q component) are supplied to the A/D converters 23a and 23b via the low pass filters 22a and 22b and converted into digital signals. At this point, the sample clock SCK synchronizing with the symbol, which is formed at the time of FSK demodulation by the symbol timing reproduction circuit 15 of the FSK demodulation unit 6, is supplied to the A/D converters 23a and 23b. Thus, timing extraction for a symbol, which must be usually performed before frequency pull-in in the PSK demodulation unit 7, can be made unnecessary, the frequency pull-in can be started immediately when a PSK modulating signal is received, and a pull-in time can be reduced.

Then, the digital signals, which are outputted from the A/D converters 23a and 23b, are inputted to the demodulation circuit 24 of the phase locked loop (PLL) type and subjected to PSK demodulation.

At this point, when the final bit of the packet header PH of the transmission packet ends, and a front bit of the preamble PA is received, the frequency error detection value fe, which is detected when the access code AC and the packet header PH of total 126 bits longer than the preamble PA of 16 bits are subjected to the FSK demodulation by the frequency error detection circuit 14 in the FSK demodulation unit 6, is inputted to the multiplexer 35 in the loop filter 29 of the demodulation circuit 24. This frequency error detection value fe is selected as an initial value and latched by the latch circuit 36, whereby the frequency error detection value fe is added to a value, which is found by multiplying the frequency offset value fo detected by the frequency offset detection circuit 28 by the second filter coefficient Ki on the basis of an output of the complex multiplier 25, by the second adder 34. This added value is added to a value, which is found by multiplying the frequency offset value fo by the first filter coefficient Kp, by the first adder 32, and supplied to the numerical control oscillator 30 as a filter output.

In this way, the frequency error detection value fe detected by the frequency error detection circuit 14 of the FSK demodulation unit 6 is selected as an initial value by the multiplexer 35 of the loop filter 29 at the time when the PSK demodulation is started, whereby an output of the frequency offset detection circuit 28 is brought close to zero and into a frequency lock state. Consequently, a time until lockup of a phase locked loop during reception of the short preamble PA of 16 bits can be reduced significantly, lockup can be performed surely during the reception of the preamble PA, and a bit error rate (BER) characteristic at the time of wireless data communication according to the PSK modulation can be improved.

Then, an output of the complex multiplexer 25 is supplied to the data reproduction circuit 27 via the low pass filters 26*a* and 26*b*, whereby the preamble PA and the PSK demodulated data of the payload PL following the preamble PA can be reproduced, and the PSK demodulated data, which is outputted from the data reproduction circuit 27, is supplied to the not-shown signal processing circuit in the later stage and subjected to signal processing.

In this way, in the first embodiment, in the case in which a former half of a transmission packet is sent by an FSK modulated signal on a transmission side, and a latter half thereof is sent by a PSK modulating signal, when this transmission packet is received by the wireless data communication demodulation device WD, an access code AC and a packet header PH of the former half are demodulated by the FSK demodulation unit 6, and a frequency error detection value fe is detected by the frequency error detection circuit 14 during the demodulation, and a sample clock SCK synchronizing with a received symbol is reproduced by the symbol timing reproduction circuit 15. Consequently, when the FSK demodulation unit 6 is switched to the PSK demodulation unit 7 after a final bit of the packet header PH is received, the PSK modulating signal is converted into a digital signal by the A/D converters 23*a* and 23*b* on the basis of the sample clock SCK in an initial state thereof, frequency pull-in becomes possible immediately at the time when reception of the PSK modulating signal is started. Moreover, since a frequency error detection value fe detected by the frequency error detection circuit 14 is set as an initial value of the loop filter 29 by the demodulation circuit 24 of the phase locked loop type, it becomes possible to significantly reduce a time until lockup of a phase locked loop and to surely lock up the phase locked loop in a short period of the preamble PA, and a bit error rate characteristic at the time of communication due to the PSK modulation can be improved.

Next, a second embodiment of the present invention will be described about FIG. 7.

This second embodiment is adapted to constitute the demodulation circuit 24 of the PSK demodulation unit 7 in the first embodiment using a phase angle calculator.

Figure 7:
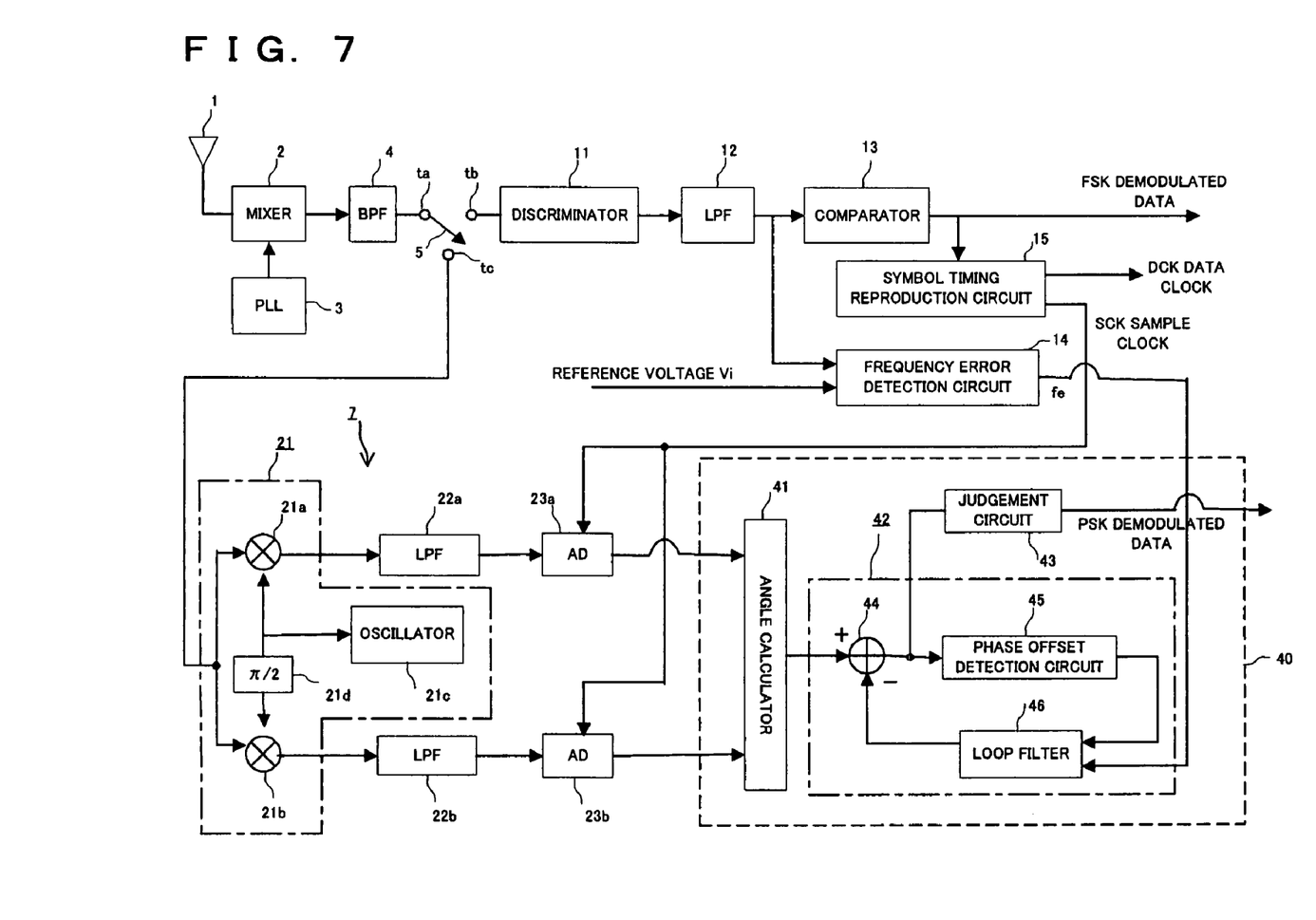
FIG. 7 is a block diagram showing a second embodiment of the present invention.

In other words, as shown in FIG. 7, the second embodiment has the same structure as FIG. 1 except that the demodulation circuit 24 in the first embodiment is changed to the demodulation circuit 40 which uses a phase angle calculator. Components corresponding to those in FIG. 1 are denoted by the identical numerals and signs, and a detailed description of the components is omitted.

The demodulation circuit 40 includes: an angle calculator 41 to which digital signals, which are outputted from the A/D converters 23*a* and 23*b*, are inputted; a phase locked loop (PLL) circuit 42 to which phase information, which is outputted from this angle calculator 41, is inputted; and a judgment circuit 43 which decodes phase information, which is formed by this phase locked loop circuit 42, and outputs PSK demodulated data.

Here, the angle calculator 41 performs an arithmetic operation of $\tan^{-1}$ (Q/I) on the basis of an in-phase component (I component) and a quadrature component (Q component) of the digital signals, which are inputted from the A/D converters 23*a* and 23*b*, to extract phase information and outputs this phase information to the phase locked loop circuit 42.

In addition, the phase locked loop circuit 42 includes: a subtractor 44 serving as phase comparing means which subtracts a filter output of a loop filter 46 to be described later from phase information, which is inputted from the angle calculator 41, and outputs an output phase synchronizing with a carrier; a phase offset detection circuit 45 to which an output phase, which is outputted from this subtractor 44, is inputted and which calculates a phase offset value po on the basis of the output phase; and a loop filter 46 to which the phase offset value po, which is outputted from this phase offset detection circuit 45, and a frequency error detection value fe, which is outputted from the frequency error detection circuit 14 of the FSK demodulation unit 6, are inputted to constitute a loop integrator and which outputs a filter output to the subtractor 44.

Here, the loop filter 46 has the same structure as FIG. 6 in the first embodiment, and the phase offset detection value po detected by the phase offset detection circuit 45 is inputted to the multipliers 31 and 33 instead of the frequency offset detection value fo detected by the frequency offset detection circuit 28.

Then, the output phase, which is outputted from the subtractor 44, is supplied to the judgment circuit 43.

According to the second embodiment, an access code AC and a packet header PH of a transmission packet sent from a transmission side can be demodulated by the FSK demodulation unit 6 as in the first embodiment to obtain FSK demodulated data. When a wireless data communication demodulation device comes into a state for receiving a preamble PA following the packet header PH, the received signal changeover switch 5 is switched to the PSK demodulation unit 7 side, and PSK demodulation in the PSK demodulation unit 7 is started.

In this case, a sample clock SCK, which is outputted from the symbol timing reproduction circuit 15 of the FSK demodulation unit 6, is also supplied to the A/D converters 23*a* and 23*b*. Thus, frequency pull-in can be started simultaneously with starting reception of a PSK demodulating signal, and a pull-in time can be reduced.

Then, an arithmetic operation of $\tan^{-1}$ (Q/I) is performed on the basis of an in-phase component and a quadrature component of a digital signal, which is outputted from these A/D converters 23*a* and 23*b*, to extract phase information, and this phase information is supplied to the subtractor 44 of the phase locked loop circuit 42. At the time when this PSK demodulation is started, the frequency error detection value fe, which has been detected by the frequency error detection circuit 14 provided in the FSK demodulation unit 6 at the time of the FSK demodulation, is selected as an initial value by the multiplexer 35 of the loop filter 46. Consequently, as in the first embodiment, a time until lockup of the phase locked loop circuit 42 can be reduced significantly, lockup can be performed surely during a reception period of the preamble PA, and a bit error rate characteristic at the time of communication due to the PSK modulation can be improved.

Then, an output phase, which is outputted from the subtractor 44, is supplied to the judgment circuit 43, whereby the PSK demodulated data is reproduced in this judgment circuit 43 and supplied to the not-shown signal processing circuit of the later stage.

Note that, in the first and the second embodiments, the description is made about the case in which a received signal is subjected to down-convert to be converted into an intermediate frequency signal by the mixer 2 and is then switched to the FSK demodulation unit 6 and the PSK demodulation unit 7 by the received signal changeover switch 5. However, the present invention is not limited to this. Since frequency shift between a transmitter and a receiver depends upon a frequency of a signal which is inputted to a mixer, a changeover position may be set arbitrarily as long as this signal is commonly used in the FSK demodulation unit 6 and the PSK demodulation unit 7. In addition, mixers may be disposed separately in the FSK demodulation unit 6 and the PSK demodulation unit 7.

In addition, in the first and the second embodiments, the description is made about the demodulation device in the case in which a former half of a transmission packet is subjected to FSK transmission and a latter half thereof is subjected to PSK transmission. However, the present invention is not limited to this. In the case in which an entire transmission packet is subjected to the FSK transmission, it is sufficient to bring the frequency error detection circuit 14 into a non-operation state to perform usual demodulation processing only with the FSK demodulation unit 6. Whether or not the PSK demodulation unit is used may be decided according to a transmission state of the transmission packet.

What is claimed is:

1. A wireless data communication demodulation device which receives and demodulates a transmission packet having a first half that includes a frequency shift keying modulating signal and a second half that includes a phase-shift keying modulating signal, the wireless data communication demodulation device comprising:
    an FSK demodulation unit for demodulating the frequency shift keying modulating signal; and
    a PSK demodulation unit for demodulating the phase-shift keying modulating signal,
    wherein:
        the FSK demodulation unit includes:
            discriminating means for generating a voltage signal based on a frequency signal that includes the transmission packet;
            comparing means for generating FSK demodulated data based on the voltage signal; and
            frequency error detecting means for detecting a frequency error of the frequency shift keying modulating signal;
        the PSK demodulation unit includes a demodulation circuit in the form of a phase locked loop; and
        a frequency error detection value detected by the frequency error detecting means is set as an initial value of the phase locked loop.

2. The wireless data communication demodulation device according to claim 1, wherein the frequency error detecting means comprises:
    average value calculating means for calculating an average frequency of the voltage signal;
    subtracting means for calculating a difference between the average frequency calculated by the average value calculating means and a reference frequency; and
    frequency converted value conversion circuit for generating the frequency error detection value based on the difference.

3. The wireless data communication demodulation device according to claim 1, wherein the PSK demodulation unit further comprises:
    orthogonal detection means for orthogonally detecting the phase-shift keying modulating signal; and
    A/D converting means for subjecting an in-phase component and a quadrature component of the phase-shift keying modulating signal to A/D conversion using a clock synchronizing with a symbol obtained by the FSK demodulation unit,
    wherein the demodulation circuit in the form of the phase locked loop is configured to receive the in-phase component and the quadrature component outputted from the A/D converting means.

4. The wireless data communication demodulation device according to claim 3, wherein the demodulation circuit comprises:
    a complex multiplier for rotating the in-phase component and the quadrature component outputted from the A/D converting means by a predetermined phase, based on a sine wave and a cosine wave for causing the components to coincide with a phase of an ideal signal point;
    a plurality of low pass filters, a first one of the plurality of low pass filters for receiving one of the rotated in-phase component and the quadrature component outputted from the complex multiplier and a second one of the plurality of low pass filters for receiving the other of the rotated in-phase component and the quadrature component;
    a data reproduction circuit for receiving an output of each one of the low pass filters;
    a frequency offset detection circuit for receiving the output of each one of the low pass filters;
    a loop filter that receives a frequency offset detection value of the frequency offset detection circuit and that receives the frequency error detected as the initial value by the frequency error detecting means; and
    a numerical control oscillator for receiving an output of the loop filter and for generating the sine wave and the cosine wave supplied to the complex multiplier.

5. The wireless data communication demodulation device according to claim 3, wherein the demodulation circuit comprises:
    an angle calculator for calculating phase information from the in-phase component and the quadrature component outputted from the A/D converting means;
    phase comparing means for comparing the phase information outputted from the angle calculator to a phase signal to generate an output signal;
    a judgment circuit for reproducing demodulated data on the basis of the output signal outputted from the phase comparing means;
    phase offset detecting means for receiving the output signal of the phase comparing means; and
    a loop filter that receives an offset detection value of the phase offset detecting means, that receives the frequency error detected by the frequency error detecting means as the initial value, and that outputs said phase signal to the phase comparing means.

6. The wireless data communication demodulation device according to claim 4, wherein the loop filter comprises:

a first multiplier and a second multiplier for multiplying the inputted frequency offset detection value by a respective one of a first filter coefficient and a second filter coefficient;

a first adder;

a latch circuit;

a second adder for adding an output of the second multiplier and an output of the latch circuit;

wherein said first adder adds an added output of the second adder and an output of the first multiplier to form an output provided to the numerical control oscillator; and a multiplexer for receiving the added output of the second adder and the frequency error detected by the frequency error detecting means as initial values and for selecting and outputting the initial values, wherein the latch circuit latches the initial values outputted by the multiplexer.

7. The wireless data communication demodulation device according to claim 5, wherein the loop filter comprises:

a first multiplier and a second multiplier for multiplying the inputted frequency offset detection value by a respective one of a first filter coefficient and a second filter coefficient;

a first adder;

a latch circuit;

a second adder for adding an output of said second multiplier and an output of the latch circuit, wherein said first adder adds an added output of the second adder and an output of the first multiplier to form an output provided to the numerical control oscillator; and a multiplexer for receiving the added output of the second adder and the frequency error detected by the frequency error detecting means as initial values and for selecting and outputting initial values, wherein the latch circuit latches the initial values outputted by the multiplexer.

8. A wireless data communication demodulation method of receiving and demodulating a transmission packet having a first half that includes a frequency shift keying modulating signal and a second half that includes a phase-shift keying modulating signal in a demodulation device, the wireless data communication demodulation method comprising:

demodulating the frequency shift keying modulating signal while detecting a frequency error in an FSK demodulation unit; and thereafter, demodulating the phase-shift keying modulating signal in a PSK demodulation unit while setting a frequency error detection value detected by the FSK demodulation unit as an initial value of a phase locked loop included in a demodulation circuit of the PSK demodulation unit; wherein the demodulating the PSK signal includes:

rotating an in-phase component and a quadrature component of the phase-shift keying modulating signal by a predetermined phase based on a received sine wave and a received cosine wave;

low pass filtering the rotated in-phase component via a first low pass filter;

low pass filtering the rotated quadrature component via a second low pass filter;

generating a frequency offset detection value based on outputs of the first low pass filter and the second low pass filter;

generating a loop filter output based on the frequency offset detection value and the initial value; and generating the sine wave and the cosine wave based on the loop filter output.

* * * * *